June 29, 1965  T. L. GRAY  3,191,701

WEIGHING APPARATUS

Filed Dec. 24, 1962  4 Sheets-Sheet 1

Tommy L. Gray
INVENTOR.

BY

ATTORNEY

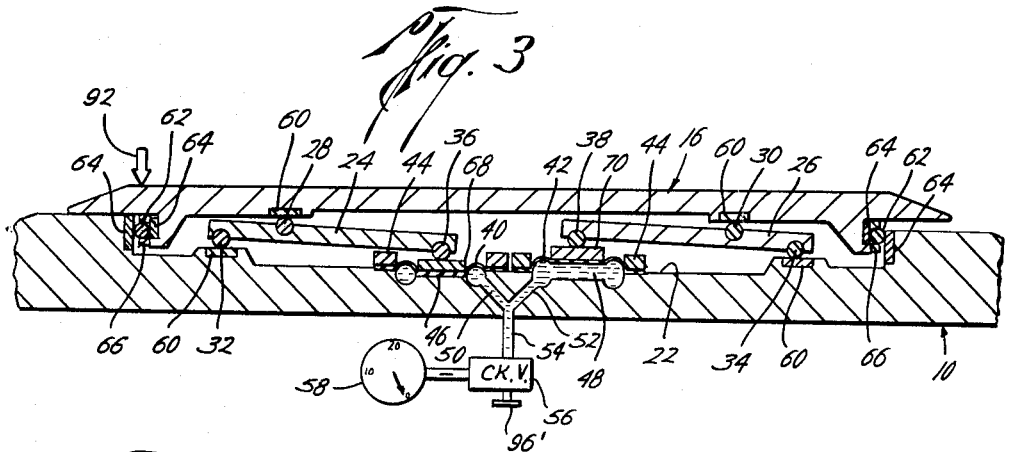

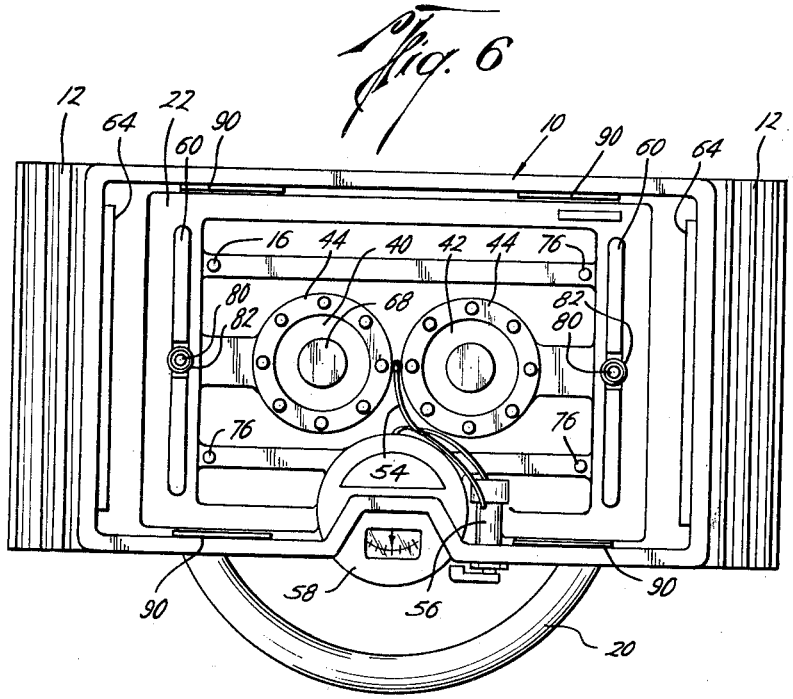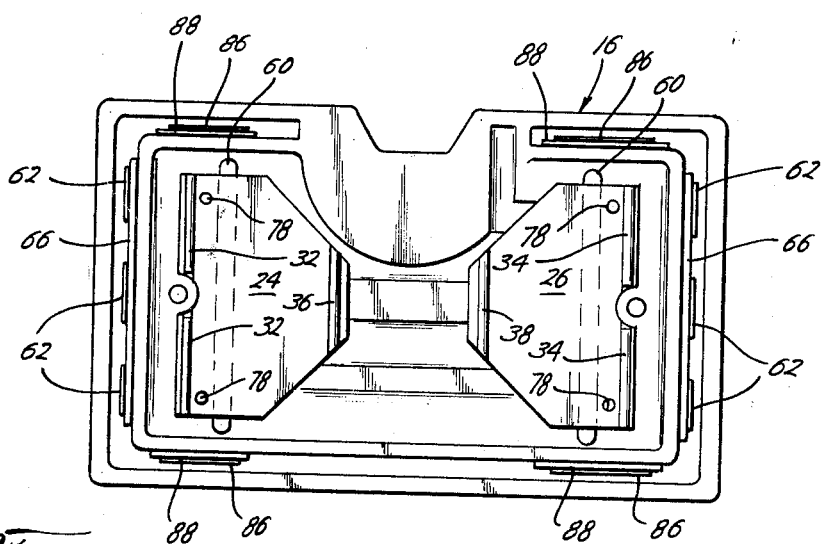

June 29, 1965
T. L. GRAY
3,191,701
WEIGHING APPARATUS
Filed Dec. 24, 1962
4 Sheets-Sheet 4
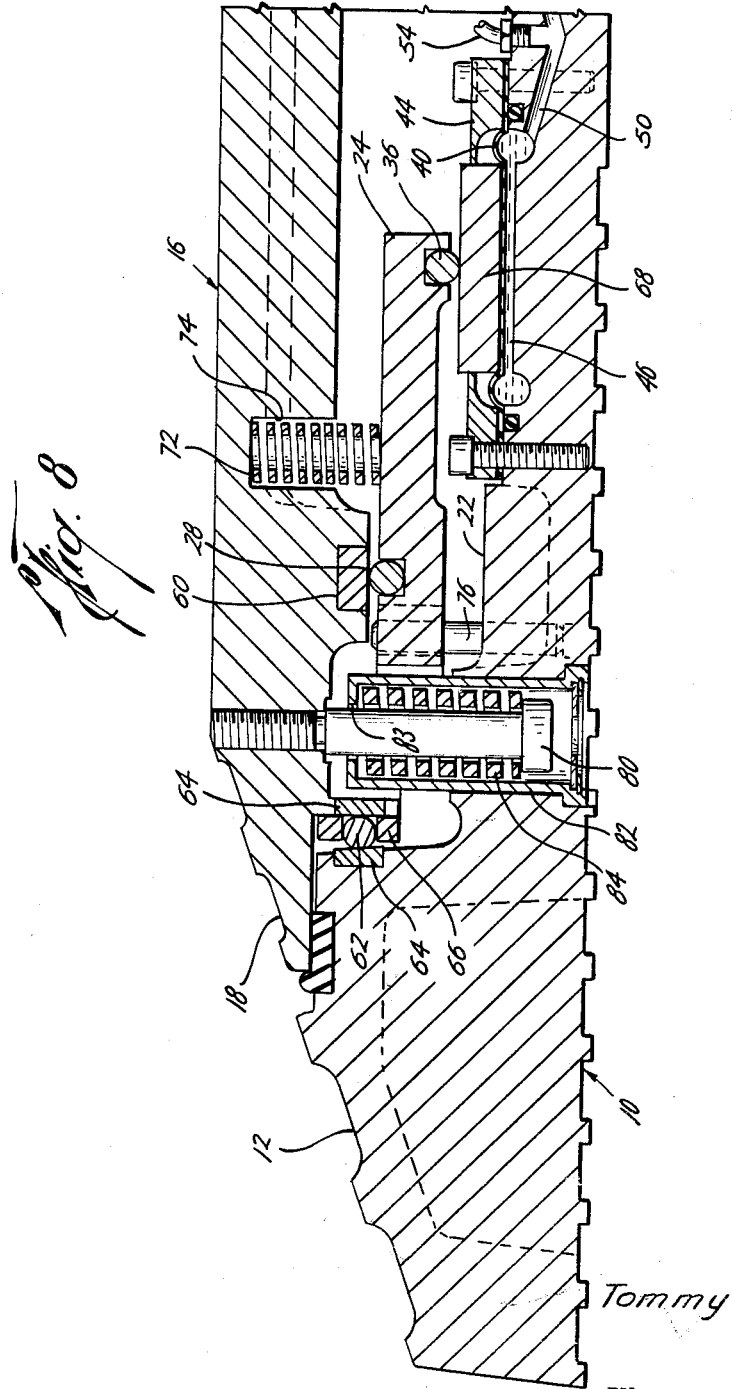
Tommy L. Gray
INVENTOR.
BY
ATTORNEY

United States Patent Office 3,191,701
Patented June 29, 1965

3,191,701
WEIGHING APPARATUS
Tommy L. Gray, Dallas, Tex., assignor to General
Electrodynamics Corporation, Garland, Tex., a
corporation of Texas
Filed Dec. 24, 1962, Ser. No. 246,697
8 Claims. (Cl. 177—209)

This invention relates to weighing apparatus and more particularly it relates to apparatus for weighing trucks and other wheeled vehicles.

There is a substantial demand for light weight portable apparatus which can be used for weighing automobiles, trucks, airplanes and other mobile equipment. Such portable equipment is particularly needed for weighing trucks. In order to prevent damage to highways the governments of various jurisdictions have enacted laws which limit the weight of load allowable upon axles of vehicles such as trucks, semi-trailers, trailers and the like within their respective jurisdictions. Proper enforcement of such laws requires maintaining vehicle or truck weighing stations at selected locations on highways. Ease of portability is particularly important where is is desired to set up an auxiliary weighing station which may be used for only a short time. Various structures have heretofore been utilized for portable weighing devices for this purpose, however such structures have generally been unsuitable because of lack of accuracy and because it has been necessary to make the measurements of weight only when the truck or other vehicle is at a standstill.

It is an object of this invention to provide light weight highly portable apparatus for accurate measurement of the weight of trucks and other wheeled vehicles. It is another object of this invention to provide such apparatus which can be used to weigh moving vehicles. In other words, the apparatus of this invention is adapted to provide an accurate measurement of the weight of a vehicle upon merely driving the vehicle wheels slowly over the apparatus.

In portable weighing apparatus heretofore used it has been the practice to apply the weight to be measured to a single load cell, i.e. to a single weight responsive device. For example the apparatus disclosed by U.S. Patent Number 1,844,080 to F. J. Troll the vehicle wheel is driven up onto a platform. The force exerted by this wheel is exerted through levers upon a single fluid supported diaphragm. The pressure upon the diaphragm is indicated by a pressure gage which is calibrated in terms of the load applied.

According to the present invention two load cells are utilized to receive the force exerted by a vehicle wheel and means are preferably provided for indicating the lesser of the forces exerted upon the load cells. As the wheel moves across the weighing apparatus it will first exert a greater force on one of the load cells and then exert a greater force on the other load cell. At an intermediate point the force exerted upon the load cells will be equal and the force at this point on each load cell will be directly proportional to the weight of the wheel upon the weighing apparatus.

For a better understanding of this invention reference is now made to the accompanying drawings wherein FIGURE 1 is an elevational view of a truck being weighed upon a plurality of weighing apparatuses according to one embodiment of this invention;

FIGURE 3 is a somewhat schematic longitudinal vertical sectional view of one embodiment of the apparatus of this invention shown in the condition wherein a load is initially moved onto the apparatus;

FIGURE 4 is a view similar to FIGURE 3 but shown in the condition of the load being applied at substantially the center of the weighing apparatus;

FIGURE 5 is a view similar to FIGURES 3 and 4 but shown in the condition wherein the load is leaving the weighing apparatus;

FIGURE 6 is a plan view of a preferred embodiment of the apparatus of this invention with platform and levers removed therefrom;

FIGURE 7 is a plan view of the underside of the weighing platform used with the apparatus of FIGURE 6, shown with the levers in place thereon; and FIGURE 8 is a vertical, longitudinal sectional view of the embodiment of FIGURES 6 and 7 assembled together.

Figure 1:
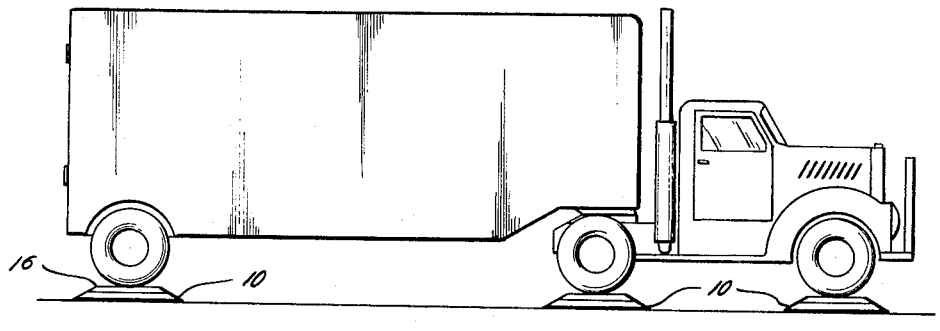

In a preferred embodiment the apparatus of this invention comprises a base 10 having a generally flat rectangular form but sloping on each end from the upper surface to the lower surface. The ends 12 are grooved to provide traction for a vehicle wheel and the bottom surface 14 is grooved to prevent slipping of the weighing apparatus on the ground. Overlying the base there is provided a weighing platform 16 which also has a generally flat rectangular shape and which is also provided with downwardly sloping ends 18 which are aligned with the sloping ends of the base 10 and are also grooved for the provision of traction for a vehicle wheel. The base is provided with a handle 20 for use in carrying the apparatus.

Figure 2:
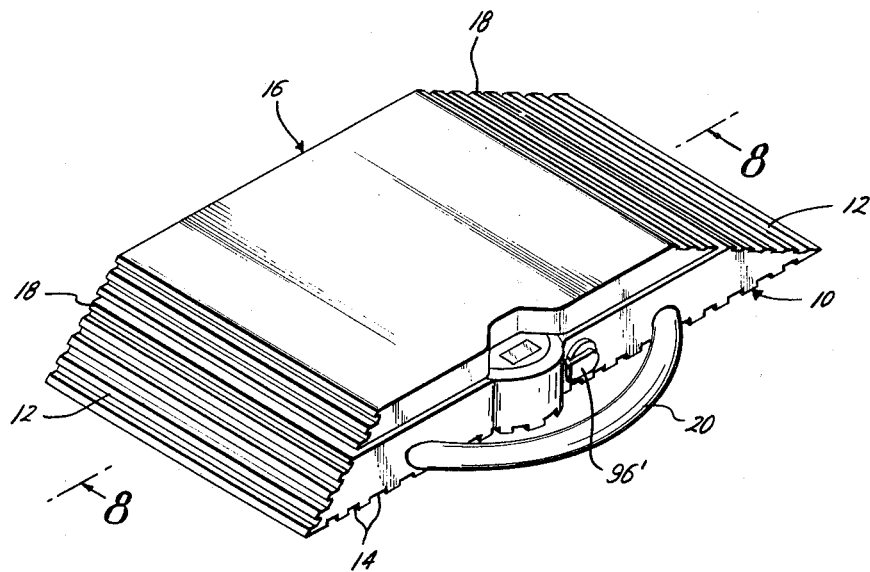
FIGURE 2 is a perspective view of one embodiment of the weighing apparatus of this invention.

FIGURES 3, 4 and 5 of the drawing are somewhat schematic in that many of the details of the structure depicted in FIGURES 2, 6, 7 and 8 are omitted in order to more clearly depict the basic structure of a preferred embodiment of the apparatus of this invention. A depression 22 is formed in the upper surface of the base 10 and underlies the weighing platform 16. The platform 16 is supported near each end on levers or platform supporting beams 24, 26 through fulcrum rollers or pins 28 and 30. The levers 24 and 26 are in turn supported on the base in the depression 22 by means of beam fulcrum rollers or pins 32 and 34 at their outer ends, spaced outwardly from the pins 28 and 30. The inner ends of the levers 24 and 26 extend toward the center of the apparatus and are supported by means of fulcrum rollers or pins 36 and 38 which rest upon pressure distribution plates 68 and 70 respectively, overlying conventional metallic diaphragms 40 and 42. Each diaphragm is held in place by means of a clamp ring 44 which sealingly engages the edge of the diaphragm to the base and encloses under the diaphragm, diaphragm chambers 46 and 48 respectively. The flexibilty and length of stroke of each diaphragm is preferably such, in proportion to the depth of the diaphragm chamber, that the diaphragm can be moved to bottom on the flat bottom of the chamber. Thus where the fluid in the diaphragm chamber is forced out of the chamber, a load applied to the pressure distribution plate will be transmitted directly to the bottom of the chamber, and the load on tha plate will not put the fluid under pressure. Alternatively, a stop may be provided externally of the diaphragm chamber to limit the travel of the diaphragm and thereby prevent pressurizing of the fluid.

Fluid conduits 50 and 52 communicate with the respective diaphragm chambers and intersect a conduit 54 which communicates through a releasable check valve 56 with a pressure gage 58. Check valve 56 may for example be of the type disclosed in my copending application Serial No. 246,748, now abandoned, filed concurrently herewith.

It will be noted that hardened blocks 60 are provided at each fulcrum roller or pin to provide a bearing surface for such fulcrum roller. The fulcrum rollers thereby serve the purpose of knife edges used in the usual weighing device and yet provide heavy duty bearing members for supporting the loads which may be incurred. Note also that at each end of the platform a roller or cylindrical pin 62 is utilized to absorb longitudinal forces which may be exerted upon the platform. Hardened blocks 64 are provided for engagement by the cylindrical pins 62. The cylindrical pins 62 are preferably rotatably received within a mounting plate 66 so as to provide a substantially frictionless bearing. Similar bearing means provided on the sides of the platform will be hereinafter described.

The somewhat schematic views in FIGURES 3, 4 and 5 having been described, the structure of a preferred embodiment as shown in FIGURES 6, 7 and 8 will be apparent. In FIGURES 6, 7 and 8 the same reference numerals have been used to indicate the same elements.

As may be seen in FIGURE 7, the levers 24 and 26 extend substantially the full width of the weighing apparatus at their outer ends but converge to a narrower width at their inner ends. Thus these levers are so shaped as to insure a uniform application of forces thereto and to insure the transmission of such forces through the fulcrums 36 and 38 to the pressure distribution plates 68 and 70 which transmit such forces to the diaphragms 40 and 42. As shown in FIGURE 8, the levers 24 and 26, in this embodiment, are properly retained in position by means of hold down springs 72 which fit into sockets 74 on the underside of the platform and engage the top of each lever. In addition guide pins 76 are affixed in the base 10 and extend upwardly therefrom to loosely engage apertures 78 in the levers to prevent movement of the levers in a horizontal plane.

The entire assembly is held together by means of bolts 80 which are positioned in a spring housing 82, the spring housing in turn being secured in the base 10 and extending upwardly from the bottom of the depression 22 toward the platform 16. The upper end of the spring housing is provided with a reduced diameter opening 83 therethrough through which the shank of the bolt 80 extends. A spring 84 is positioned between the head of the bolt 80 and the shoulder formed at the upper end of the spring housing around the opening 83. The bolt 80 extending through the opening 83 is threadedly engaged with the platform 16. It is apparent that this arrangement prevents the platform from falling off the base when the weighing apparatus is being carried by means of the handle 20 and yet leaves the platform free to move vertically with respect to the base when the weighing apparatus is in position on the ground for weighing a wheeled vehicle. The hold down springs 72 and 84 preferably have little or no initial compression, or otherwise if they are initially compressed the forces resulting from such compression will be taken into account in calibration of the weighing mechanism.

Forces tending to move the platform 16 laterally with respect to the base are absorbed by means of cylindrical pins 86 which are rotatably received in housings 88 attached to the sides of the platform which extend down within the depression 22 of the base. The rollers or cylindrical pins 86 engage hardened plates 90 which are embedded in side walls of the depression 22 in the base 10.

Preferably the pressure gage is calibrated and designed to read directly in pounds load, such calibration taking into account lever ratios and the effective area of the diaphragms, as well as the tare weight resulting from the weight of the platform and the levers, and any forces exerted by the springs.

Reference is now made particularly to FIGURES 3, 4 and 5 for a discussion of the operation of this embodiment of the invention. The weighing apparatus is placed on the ground in front of the wheel of the vehicle to be weighed and then the vehicle wheel is moved up the incline on the left end of the apparatus as shown in the drawing and is moved across the weighing platform and down the incline on the right end of the weighing apparatus. It is not necessary to stop the vehicle at any time. Upon initial contact of the vehicle wheel with the weighing platform the forces upon the weighing platform will be concentrated as indicated by the arrow 92. At this point the fulcrum at the opposite end of the platform has no load upon it. However at least some of the load is applied to the fulcrum 28. This load is transmitted through the lever 24 to fulcrum 36 and thus to the diaphragm 40. The diaphragm 40 is thus depressed until it hits a stop, which may be the bottom of the diaphragm chamber 46. Fluid is forced out of this diaphragm chamber and through the conduits 50 and 52 into diaphragm chamber 48. Since diaphragm 42 is not loaded, and diaphragm 40 is against a stop, little or no pressure will be exerted upon the fluid system and therefore the pressure gage 58 will not indicate any load. As the wheel moves longitudinally of the platform this condition persists until the wheel passes over the fulcrum 28. At this point the fulcrum 30 begins to receive some load so that a small pressure is exerted upon the fluid system. This pressure gradually increases as the wheel approaches the center of the platform. When the load is at the center of the platform, as indicated by the arrow 94 in FIGURE 4, the loads exerted through the fulcrums 28 and 30 are equal. Thus the forces applied to the diaphragms 40 and 42 are equal, so that fluid flows back from diaphragm chamber 48 into diaphragm chamber 46 to balance the chambers as shown in FIGURE 4. At this point, the pressure applied to the fluid system is at a maximum. This pressure is indicated upon the pressure gage 58. Then as the wheel continues longitudinally of the platform the proportion of the load transmitted through fulcrum 30 is increased and the proportion transmitted through fulcrum 28 is decreased. Thus more fluid moves from the diaphragm chamber 48 into diaphragm chamber 46, until the diaphragm 42 is bottomed, as shown in FIGURE 5, and the load transmitted through fulcrum 30 bears on the base through the plate 70 and the diaphragm 42 rather than through the fluid. The pressure on the fluid system will decrease, therefore, in proportion to the decrease in the load on the diaphragm 40. However, the check valve 56 prevents the release of the pressure on the pressure gage 58 so that this gage continues to indicate the maximum pressure which has existed in the system.

Finally as the wheel moves to the right end of the platform as shown in the drawing the force applied thereby will be exerted at the position indicated by the arrow 96 in FIGURE 5. At this point little or no load is exerted through fulcrum 28, however at least some of the load is exerted through fulcrum 30. At this point there is only a small pressure in the fluid system but the pressure gage 58 continues to indicate the pressure exerted when the wheel was at the center of the platform as shown in FIGURE 4.

After the wheel has moved off the platform and down the incline on the right end of the weighing apparatus the pressure gage may be used to determine the load exerted by the wheel. The check valve 56 is then released by operation of the handle 96 which pushes the check valve off its seat and allows the pressure upon the pressure gage to bleed off back into the fluid system of the weighing apparatus.

It will be apparent that the pressure exerted upon the fluid is always proportional to the lesser of the forces exerted upon the diaphragms. When the load is at the center of the platform the loads on the diaphragms are equal and therefore the pressure exerted upon the fluid system is at a maximum. When the load on the platform is at any point other than the center a greater proportion of the load is transmitted through one of the diaphragms than is transmitted through the other, so that the more highly loaded diaphragm hits a stop, and therefore does not exert a pressure on the fluid system, and the pressure on the system is less than when the load was at the center. In this embodiment, the check valve provides means for retaining upon the pressure gage, or indicator, an indication of the maximum pressure exerted on the fluid, i.e. the pressure exerted when the wheel is at the center of the platform.

It is well known that some bouncing of a truck wheel occurs when it rolls onto a weighing platform. Where only a single load cell is used, as in the prior art, such bouncing would cause an indication of a higher load than the actual load exerted by the truck wheel. In the apparatus of this invention, however, such bouncing occurs when the weight of the wheel is exerted on a portion of the platform wherein only a minor proportion of the weight results in pressurization of the fluid system, therefore the bouncing of the truck will not cause an indication of a higher load than the actual load. It has been demonstrated that such bouncing of the wheel substantially ceases by the time the truck wheel reaches the center of the weighing platform. Thus it is possible, according to the present invention, to weigh the wheel as it moves across the platform instead of having to stop the wheel on the platform and allow it to become stable before taking a reading of weight. Furthermore, since the initial moving of the wheel onto the platform causes one of the diaphragms, or apparatus associated therewith, to hit a stop there can be no shock loads applied to the diaphragms as a result of the bouncing of the truck wheel. In addition, the possibility of shock loads being applied to the pressure gage is eliminated, since the pressure exerted upon the gage rises slowly as the wheel traverses the platform. Where only a single diaphragm is used, as in the prior art, the entire load is exerted against the fluid system as soon as the wheel engages the platform.

Many modifications of this invention will be apparent to those skilled in the art. Although in the preferred embodiment described herein a metallic diaphragm together with a diaphragm chamber and fluid system have been described as constituting the load cell through which forces are exerted to indicate the loading on the platform other load cells known in the art may also be used. For example, a diaphragm of the Bellofram type may be used, or a strain gage type load cell such as utilized in U.S. Patent No. 2,962,276 to Thurston may be used.

In addition, linkage systems other than the levers disclosed herein may be utilized as desired for reducing the proportion of the total load which is transmitted to the load cells. Similarly other types of fulcrums are known in the art and may be found to be advantageous under some circumstances. Thus the present invention is not limited to the particular embodiment shown and described herein but only as set forth by the following claims. For convenience the claims are in subparagraph form but such form is not to be construed to be limiting of the claims nor to restrict their interpretation in any manner which would not be contemplated if the claims were not written in such form.

I claim:
1. Weighing apparatus comprising
  a platform,
  a pair of platform supporting beams each pivotally supporting one end of said platform at a fulcrum near one end of the supporting beam,
  a beam fulcrum pivotally supporting each platform supporting beam at said one end,
  separate fluid displacement means under the other end of each platform supporting beam,
  means limiting the displacement of fluid when the load on one fluid displacement means is greater than the load on the other,
  a fulcrum pivotally engaging each fluid displacement means with a beam end,
  means providing fluid communication between said fluid displacement means, and
  means for indicating the pressure of fluid in said fluid displacement means.

2. Weighing apparatus comprising
  a pair of fluid displacement means actuable to displace fluid upon the application of a load thereto, means limiting the displacement of fluid when the load on one fluid displacement means is greater than the load on the other,
  fluid conduit means interconnecting said fluid displacement means for communication of fluid therebetween,
  indicator means for indicating the load applied, a scale platform, and
  linkage means interconnecting each end of said scale platform to one of said fluid displacement means.

3. Weighing apparatus as defined by claim 2 and including
  means for retaining upon said indicating means an indication of the highest load applied.

4. Weighing apparatus comprising
  a pair of load cells each actuable, upon the application of a load thereto, to provide a signal proportional to said load,
  means for indicating the lesser of said loads,
  a scale platform, and
  linkage means connecting one end of said scale platform to each of said load cells.

5. Weighing apparatus comprising
  a base,
  an upwardly opening depression in said base,
  a platform overlying said depression,
  laterally extending scale levers beneath the platform,
  fulcrum means supporting the levers near the ends of said depression,
  bearing means for the platform and corresponding bearing means on the levers spaced inwardly from the fulcrum points,
  a diaphragm beneath the inner end of each lever,
  means at the inner end of each lever bearing on a diaphragm, and
  means for indicating the lesser of the forces bearing on said diaphragms.

6. Apparatus as defined by claim 5 wherein
  each diaphragm encloses a diaphragm chamber having a depth no greater than the maximum stroke of the diaphragm, and
  means providing fluid communication between said diaphragm chambers.

7. Weighing apparatus comprising
  a base,
  a longitudinally extending platform overlying said base,
  a pair of load cells longitudinally spaced apart on said base and each adapted to be actuated, upon the application of a load to said platform, to provide a signal proportional to said load, and
  means for indicating the lesser of said loads.

8. Weighing apparatus comprising
  a pair of load cells each actuable, upon the application of a load thereto, to provide a signal proportional to said load,
  a scale platform,
  linkage means connecting one end of said scale platform to each of said load cells, and
  means for indicating the load on one of said load cells.

References Cited by the Examiner

UNITED STATES PATENTS 1,844,080   2/32   Troll _____ 177—151

FOREIGN PATENTS 440,258   2/27   Germany.
230,030   4/25   Great Britain.
271,314   5/27   Great Britain.

LEO SMILOW, *Primary Examiner.*